A. P. TESKEY.
PERISCOPE ATTACHMENT FOR SUBMARINES.
APPLICATION FILED SEPT. 10, 1917.

1,272,873.

Patented July 16, 1918.

Witnesses:

Inventor
A. P. Teskey
By Chandler & Chandler
Attorneys

UNITED STATES PATENT OFFICE.

ALVA P. TESKEY, OF LUVERNE, MINNESOTA.

PERISCOPE ATTACHMENT FOR SUBMARINES.

1,272,873.  Specification of Letters Patent.  Patented July 16, 1918.

Application filed September 10, 1917. Serial No. 190,610.

*To all whom it may concern:*

Be it known that I, ALVA P. TESKEY, a citizen of the United States, residing at Luverne, in the county of Rock, State of Minnesota, have invented certain new and useful Improvements in Periscope Attachments for Submarines; and I do hereby declare the following to be a full, clear, and exact description of the invention, such as will enable others skilled in the art to which it appertains to make and use the same.

This invention is an improvement in submarine vessels and has particular reference to an attachment for the periscopes thereof.

It is well known that when submarines are traveling partially submerged with only the periscopes projecting above the surface of the water the speed of the vessel creates a suction aft of the periscope resulting in a white wake that may be seen at considerable distance thereby endangering the safety of the vessel when in the neighborhood of enemy craft.

The present invention is designed to overcome this objection and, to this end, provides an attachment for the periscope movable thereon so as to remain upon the surface of the water during various degrees of submergence of the vessel and conceal the wake formed by the periscope.

Briefly stated, the attachment consists of a sleeve member slidable longitudinally of the periscope and supporting a frame to which is attached a flexible element made of any suitable material surrounding the periscope and adapted to float upon the surface of the water so as to cover wake formed by the periscope and prevent the white spray which usually results from the formation of the wake.

The inventive idea involved is capable of receiving a variety of mechanical expressions one of which, for the purpose of illustrating the invention, is shown in the accompanying drawing, wherein:—

Figure 1:
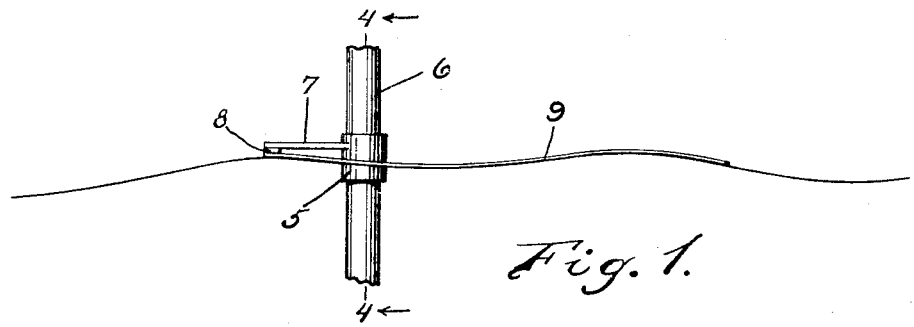
Figure 1 is a fragmentary side elevation of a periscope showing the invention applied thereto and in operative position.
Figure 2:
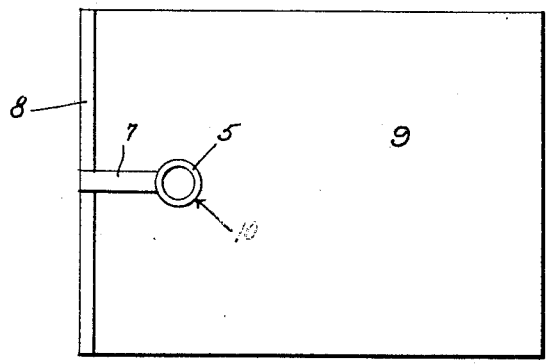
Fig. 2 is a top plan view.
Figure 3:
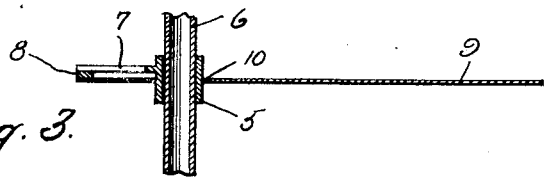
Fig. 3 is a longitudinal section.
Figure 4:
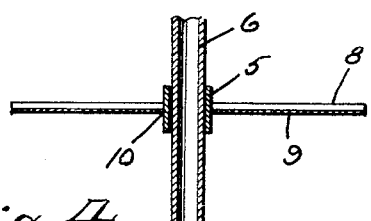
Fig. 4 is a section on the line 4—4 of Fig. 1.

The preferred form of the invention is illustrated in the accompanying drawing and comprises a sleeve member 5 loosely mounted to slide upon the periscope 6 which may be of any preferred structure, said member 5 being made of light buoyant material so that same will slide longitudinally of the periscope when the same is submerged to different degrees and thus, at all times, remain upon the surface of the water. The sleeve member 5 carries a supporting frame consisting of an arm 7 having one end secured to the sleeve member and extending forwardly therefrom. The other end of the arm has attached thereto the transverse bar or arm 8 to which is secured longitudinally thereof, in any preferred manner, the forward edge of a flexible element 9 made of any preferred material and of rectangular formation and provided therein with an opening 10 through which the sleeve member 5 and periscope 6 extends.

The flexible member 9 may be made of different sizes and when in operative position it will be apparent that only a minor portion thereof extends forwardly of the periscope while the remaining and greater portion extends aft so that the same will cover the wake formed by the periscope moving through the water and prevent the white spray incident to a wake from becoming visible. It will further be apparent that by the provision of a frame consisting of the arms 7 and 8 the flexible element 9 will be readily held adjacent its forward portion so that the same will remain in a horizontal position with reference to the surface of the water.

What is claimed is:—

1. The combination with a periscope; of a wake-concealing device made of flexible material connected with said periscope for movement longitudinally thereof and extending laterally of the periscope in all directions.

2. The combination with a periscope; of a wake-concealing device carried thereby and consisting of a sheet of flexible material and having an opening therein adjacent one end, a sleeve secured in the opening and slidable on said periscope, and a supporting frame connected to the sleeve and secured to said sheet of material at its forward end.

3. The combination with a periscope, of a floatable wake concealing device movable longitudinally of the periscope and surrounding the same.

4. The combination with a periscope, of a wake concealing device including a sheet of flexible material adapted to float upon the surface of the water.

5. The combination with a periscope, of a wake concealing device including a sheet of flexible material adapted to float upon the surface of the water and surround said periscope.

6. The combination with a periscope, of a wake concealing device including a sheet of flexible material adapted to float upon the surface of the water, and a sleeve movable longitudinally of said periscope and carrying said sheet.

In testimony whereof, I affix my signature in the presence of two witnesses.

ALVA P. TESKEY.

Witnesses:
 ALFRED M. GILL,
 E. V. ESTENSEN.

Copies of this patent may be obtained for five cents each, by addressing the "Commissioner of Patents, Washington, D. C."